(No Model.)
R. A. DANIELS.
WEIGHING AND PRICE SCALE.
No. 442,218.   Patented Dec. 9, 1890.
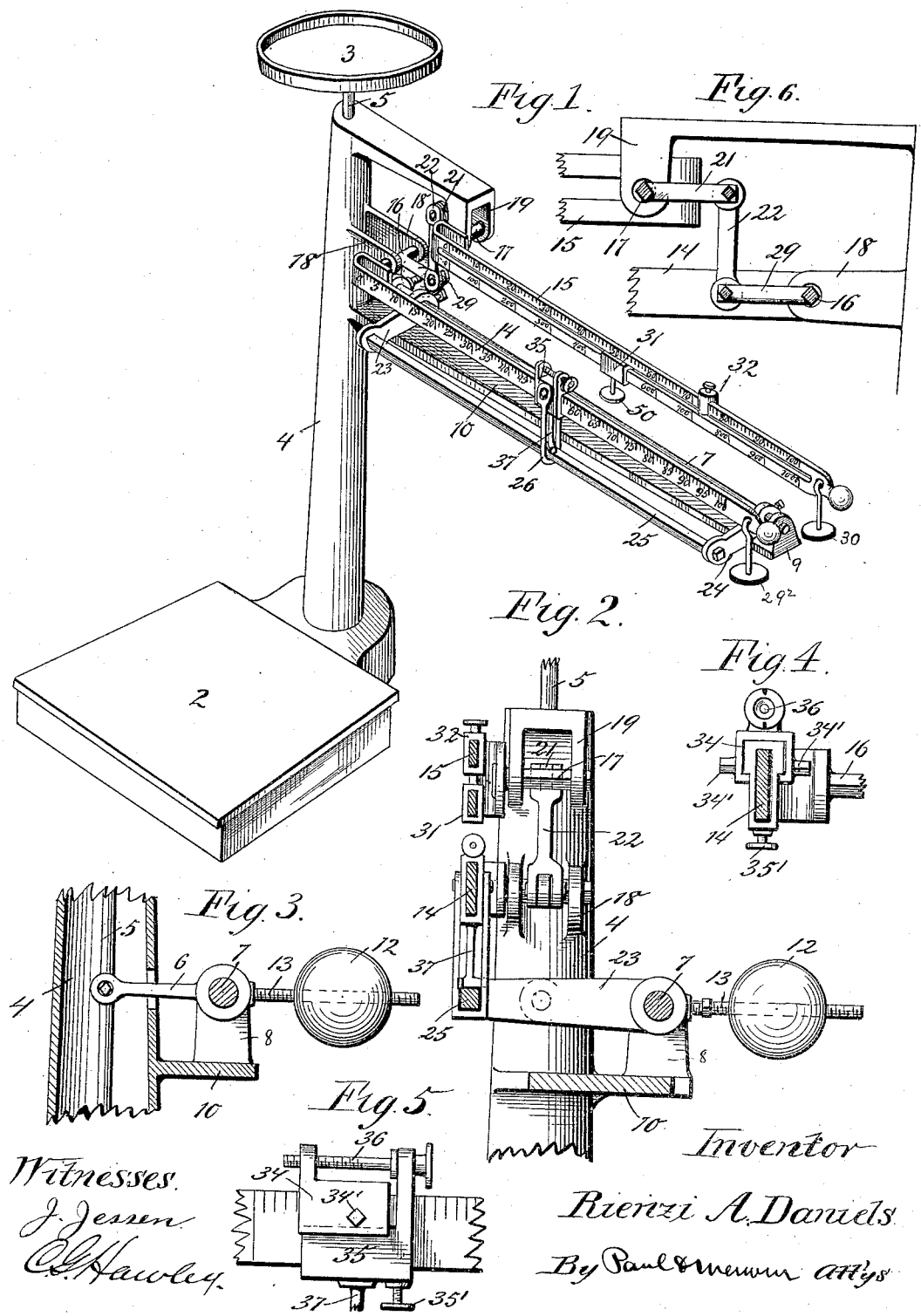
Witnesses.
J. Jessen
C. L. Hawley
Inventor
Rienzi A. Daniels
By Paul & Mervin Att'ys

UNITED STATES PATENT OFFICE.

RIENZI A. DANIELS, OF MINNEAPOLIS, MINNESOTA.

WEIGHING AND PRICE SCALE.

SPECIFICATION forming part of Letters Patent No. 442,218, dated December 9, 1890.

Application filed June 26, 1890. Serial No. 356,780. (No model.)

*To all whom it may concern:*

Be it known that I, RIENZA A. DANIELS, of Minneapolis, in the county of Hennepin and State of Minnesota, have invented certain Improvements in Weighing and Price Scales, of which the following is a specification.

My invention relates to improvements in that class of scales in which is indicated the money value of the whole amount of material sold at any desired price for a single pound or other unit of any material placed upon the scale, thus enabling persons using the scale to sell material by the cost or price in unit without any calculation as to the amount which should be given for any specific sum of money—as, for example, if it is desired to sell five dollars' worth of material, the price per pound being given, the scale will be used to determine the amount of material to be given for this sum of money without the necessity of making any computation as to the weight thereof, or the reverse of this result may be obtained.

The invention consists, generally, in the construction and combination hereinafter described, and particularly pointed out in the claims.

In the accompanying drawings, forming a part of this specification, Figure 1 is a perspective view of a weighing and price scale embodying my invention. Fig. 2 is a sectional elevation of the supporting-arm extending from the upright portion of the scale, in connection with the several bars and scale-arms, the outer ends of the same being removed. Fig. 3 is a detail sectional view showing the connecting-rod between the platform and scoop-support and the counterbalance-weight by means of which the scale is adjusted. Fig. 4 is a detail end elevation of the sleeve and yoke for setting the scale for any desired price per pound. Fig. 5 is a side elevation thereof, showing the means for adjusting the same, and the price per unit is represented by an amount of money that includes a fraction of the money-unit. Fig. 6 is a detail.

In the drawings, 2 represents the platform; 4, the scale-standard; 3, the scoop or pan, and 5 the rod by which the platform mechanism and the scoop are connected.

The platform mechanism and the scoop or pan and their connections may be of any ordinary or preferred construction, and the platform and pan or scoop may have any desired ratio to each other.

In the scale that I have shown the platform and pan or scoop are in proportion of ten to one. The pedestal or support 4 is provided with a projecting arm 10 and also with projections 18 and 19, which support the beams, as hereinafter described. Mounted so as to turn freely in bearings 8 and 9 upon the arm 10 is the shaft 7, that is connected by an arm 6 with the rod 5, located within the pedestal 4, as described. A threaded arm 13 projects in the opposite direction from the shaft 7, and is provided with the adjustable weight 12, that may be adjusted on said rod for the purpose of balancing said scale. Secured to the shaft 7, preferably near the opposite ends thereof, are the arms 23 and 24, which support the rectangular bar 25, extending parallel with the shaft 7. There are two scale-beams 14 and 15. The beam 14 is used to indicate the price per pound and the beam 15 the value of the material weighed at the price per pound indicated upon the other beam. The beam 14 is supported upon bearings 16 in the arms 18 on the pedestal, and the beam 15 upon bearings 17 in the projections 19 on the pedestal. The bearing 16 has a projecting arm 20, and the bearing 17 a projecting arm 21, and these arms are connected by a suitable link 22. By this means it will be noticed that as one scale-beam moves up the other moves in the opposite direction. The connection from the platform or scoop to the scale-beams is made by means of the movable sleeve or marker 35, arranged upon the beam 14 and provided with a loop 26, that encircles the rectangular bar 25. It will be seen that by changing the position of this sleeve the connection between the platform or scoop and the beams is at once changed, and the relative proportions of the parts are such that this sleeve may be set at any point upon the scale-beam 14, and will then indicate the price per pound of the material to be weighed by being opposite the number on the scale-beam representing such price. The sleeve is made in two parts, the part 35 being upon the beam and being provided with a set-screw 35', by means of which it may be secured in any desired position. The other part of the sleeve 34 is mounted upon the main portion of the sleeve and is adapted to slide thereon. This part of the sleeve is provided with the knife-edges 34', and to these the loop 26 is connected. A screw 36 is swiveled upon the main part of the sleeve and engages a threaded opening in the other part. The head of this screw may be provided with a graduation or scale by means of which the movable portion of the sleeve may be accurately adjusted for any desired fraction of a cent or other unit. The sleeve 35 is provided with the depending projection 37, that rests upon the upper surface of the bar 25. The loop 26 and this projection 37 cause the bar 25 and the scale-beam 14 to move together, while permitting the independent adjustment of the part of the sleeve carrying the loop 26. The upper scale-beam 15 is preferably formed in two parts and provided with the two sliding weights 31 and 32, these weights being in the proportion of ten to one. The upper portion of the beam is preferably graduated from zero to one hundred, each graduation representing a single unit, and the lower portion of the beam is graduated from zero to one thousand, each graduation, as shown, representing one hundred—one hundred more than the preceding graduation. In weighing material on the pan or scoop 3 the lower weight 31 is used; but the reading is upon the upper part of the beam. In weighing material upon the platform the upper weight is used for amounts less than one hundred and the lower weight for amounts above that, both readings being upon the part of the beam carrying the weight used. If, for example, it is desired to weigh one dollar's worth of material, the material being worth, for example, ten cents per pound, the sleeve 35 on the lower beam is set opposite the "10" on that beam, and if the material is to be weighed upon the platform the upper weight is moved opposite the mark of "100" on the upper part of the scale-beam, or if the material is to be weighed upon the scoop the lower weight is moved opposite the mark of "100" on the upper part of the scale-beam. The material is then placed upon the scale, platform, or scoop, as the case may be, until the lower scale-beam goes down and the upper one goes up, and the amount of material on the scale will then be the amount that should be given at the price per pound indicated by the lower beam for the amount of money indicated by the upper beam. If preferred, additional weight-supports 29² and 30 may be provided upon the beams and a weight-support 50 upon the sliding weight 31 upon the upper beam. The scale might equally well be used for indicating the amount of money that should be paid for a given amount of material at a specified price per pound. The material in that instance would be placed upon the scale, platform, or scoop, and the sleeve on the lower beam be set to indicate the price per pound, and the weights on the upper beam would then be moved into such position upon the beam as to be balanced by the weight of the material, and the amount indicated upon the upper beam would then be the value of the material upon the scale at the indicated price per pound.

I have described the price-scale device embodying my invention as applied to a balance device provided with both a platform and a scoop or pan connected by the rod 5. It is obvious, however, that my device might be used in connection with many other forms of balance devices, with which the connections might be made through the medium of a bar similar to the bar 6, or it could be used in a scale provided with a platform or a scoop, either one alone.

I claim—

1. The combination, in a device of the class described, of the platform and the scoop support or plate, the rod 5, connecting the same with the arm 6, pivoted thereto, the shaft 7, to which said arm 6 is fixed and with which it is adapted to move the adjustable weight 12 and threaded arm 13, the projecting and supporting arm or bracket 10, provided with the bearings 8 and 9, in which the shaft 7 is adapted to move, the arms 23 and 24, secured to said shaft 7 and adapted to move therewith in connection with the rod 25, the scale-arms 14 and 15, supported upon the bearing-rods 16 and 17 and connected, through the medium of the arms 21 and 29 thereon, with the link 22, the whole being supported by the projecting bearings 18 and 19, the link-connection 26 between the rod 25 and the scale-arm 14, as shown, the sliding weight 35, said sliding weight being provided with the adjustable portion 34 and the adjustment-screw 36, and the sliding weights 31 and 32, all substantially as shown and described.

2. The combination of the connecting-rod 5 of the weighing-scale with a main shaft supported in suitable bearings upon an arm projecting laterally from the standard of said weighing-scale, said shaft being connected with the said connecting-rod 5 by a pivoted arm or link secured to said shaft, arms projecting from said shaft, a connecting-rod between the ends of said arms, graduated scale-arms pivotally linked together and adapted to move in opposite directions upon suitable bearings, sliding weights upon said graduated scale-arms, the sliding weight upon one of said arms being movably linked with said rod extending between the said arms projecting from said main shaft, and means for accurately adjusting the weighing-scale, substantially as described.

3. The combination of the main shaft supported in suitable bearings with a suitable balance mechanism attached to said shaft, the arms 23 and 24 upon said shaft, the bar 25, connecting said arms, the scale-beams 14 and 15, linked together, as shown, by the arms 21 and 29 and the link 22, the sliding weights 31, 32, and 35 upon said scale-beams, the link 26 connecting the sliding weight 35 with the bar 25, the foot 37, and the supports for said arms 21 and 29, substantially as described.

4. In a scale of the class described, the combination, with the separately-pivoted beams provided with graduations for indicating prices, of the arms or projections 21 and 29 and the link 22, forming a connection between said beams, the movable bar 25, connected with the balance mechanism of the scale, and an adjustable sliding block and link connecting said bar with one of said beams, substantially as described.

In testimony whereof I have hereunto set my hand this 19th day of June, 1890.

RIENZI A. DANIELS.

In presence of—
A. C. PAUL,
C. G. HAWLEY.